United States Patent
Fukuyama et al.

(10) Patent No.: US 8,059,365 B2
(45) Date of Patent: Nov. 15, 2011

(54) HEAD STACK ASSEMBLY, MANUFACTURING METHOD THEREOF AND MULTI-DISC MAGNETIC STORAGE DEVICE

(75) Inventors: Hiroshi Fukuyama, Kanagawa (JP); Makoto Ono, Kanagawa (JP); Yoshiteru Katsumura, Kanagawa (JP); Yasunori Nishimoto, Kanagawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 413 days.

(21) Appl. No.: 12/380,491

(22) Filed: Feb. 26, 2009

(65) Prior Publication Data

US 2009/0225476 A1 Sep. 10, 2009

(30) Foreign Application Priority Data

Mar. 4, 2008 (JP) ................. 2008-053547

(51) Int. Cl.
*G11B 5/23* (2006.01)
*G11B 5/127* (2006.01)

(52) U.S. Cl. .............. 360/119.12; 360/125.09

(58) Field of Classification Search ............. 29/603.05, 29/603.03, 603.09; 360/266.1, 903, 264.8, 360/265.6

See application file for complete search history.

(56) References Cited

U.S. PATENT DOCUMENTS

| 6,881,124 | B2 | 4/2005 | Takahashi et al. | |
| 7,023,633 | B2 * | 4/2006 | Malone, Sr. | 360/31 |
| 7,145,740 | B2 * | 12/2006 | Zayas et al. | 360/48 |
| 7,900,341 | B2 * | 3/2011 | Katsumura | 29/603.03 |

\* cited by examiner

*Primary Examiner* — Hoai V Ho
*Assistant Examiner* — Min Huang
(74) *Attorney, Agent, or Firm* — Mahamedi Paradice Kreisman LLP; Christopher J. Brokaw

(57) ABSTRACT

Embodiments of the present invention provide a head stack assembly and a manufacturing method thereof in which manufacturing costs as a multi-disc magnetic device are reduced by increasing the yield and reducing inventory of magnetic heads which can be assembled to the head stack assembly. According to one embodiment, a head stack assembly and a manufacturing method thereof includes plural actuator arms to which magnetic heads are assembled through suspensions. The tolerance of the core width or the write element width of the magnetic heads assembled to inside actuator arms of the plural actuator arms is set to be narrower than the tolerance of the core width or the write element width of the magnetic heads assembled to the outside actuator arms.

12 Claims, 14 Drawing Sheets

Fig.14

| RANK | HEAD SERIAL NUMBER | CORE WIDTH(nm) | |
|---|---|---|---|
| 1 | AA1118715 | 83.53 | ← P1 |
| 2 | AA1118893 | 84.01 | |
| 3 | AA1116584 | 84.33 | |
| 4 | AA1115315 | 84.35 | |
| ... | ... | ... | |
| 12007 | AA1115318 | 89.70 | |
| 12008 | AA1116088 | 89.73 | ← P2 AFTER CHANGE |
| 12009 | AA1116791 | 89.88 | |
| 12010 | AA1116855 | 89.97 | |
| 12011 | AA1118895 | 90.15 | ← INITIAL VALUE OF P2 |
| 12012 | AA1117903 | 90.20 | |
| ... | ... | ... | |
| 37000 | AA1117789 | 99.98 | |
| 37001 | AA1118100 | 100.01 | ← INITIAL VALUE OF P3 |
| 37002 | AA1118811 | 100.05 | |
| 37003 | AA1118903 | 100.10 | |
| 37004 | AA1118662 | 100.17 | |
| 37005 | AA1118559 | 100.20 | |
| 37006 | AA1118707 | 100.26 | |
| 37007 | AA1117334 | 100.27 | ← P3 AFTER CHANGE |
| 37008 | AA1118035 | 100.35 | |
| ... | ... | ... | |
| 49998 | AA1118548 | 118.1 | |
| 49999 | AA1117765 | 118.5 | |
| 50000 | AA1116901 | 119.2 | ← P4 |

HEAD STACK ASSEMBLY, MANUFACTURING METHOD THEREOF AND MULTI-DISC MAGNETIC STORAGE DEVICE

CROSS-REFERENCE TO RELATED APPLICATION

The instant nonprovisional patent application claims priority to Japanese Patent Application No. 2008-053547 filed Mar. 4, 2008 and which is incorporated by reference in its entirety herein for all purposes.

BACKGROUND OF THE INVENTION

A multi-disc magnetic storage device is configured to perform recording/retrieving of information with respect to plural magnetic discs which are storage media by plural sets of magnetic heads. One multi-disc magnetic storage device includes a head stack assembly having plural actuator arms to which plural magnetic heads for the surface, and plural magnetic heads for the back, are respectively attached which are incorporated to discs as plural storage media according to the storage capacity (the number of discs).

In the head stack assembly to which plural magnetic heads are assembled, plural magnetic heads for the surface and plural magnetic heads for the back are provided alternately with respect to plural discs which are storage media. The magnetic head for the surface and the magnetic head for the back are designed and manufactured so that an air-bearing surface and the like is almost line-symmetrical with respect to a disc for realizing highly accurate low flying. That is, the magnetic head for the surface and the magnetic head for the back are formed in accordance with different design drawings.

Here, the magnetic heads, particularly, read elements and write elements in the magnetic head are manufactured with microfabrication, and the completed read elements and write elements of the magnetic head may vary in quality. Both the magnetic heads for the surface and the magnetic heads for the back are randomly assembled to the head stack assembly when they are within a certain degree of tolerance.

Additionally, it is known that variation of the magnetic core width of the magnetic head particularly affects quality of the multi-disc magnetic storage device. For example, in U.S. Pat. No. 7,023,633 ("Patent Document 1"), magnetic heads to be assembled to the head stack assembly may be finely classified into similar core widths in advance in accordance with the core width and that the magnetic heads having the similar core width are assembled to the same head stack assembly.

As described above, in the method in which both the magnetic heads for the surface and the magnetic heads for the back are randomly assembled to the head stack assembly when they are within a certain degree of tolerance, when the good product rates (yield as the multi-disc magnetic storage devices) is intended to be increased, the tolerance has to be narrowed. As a result, the yield of the magnetic head may be low, which increases manufacturing costs.

Also in the method described in Patent Document 1, it may be necessary to align magnetic heads having similar core widths. Actually, it is difficult to align magnetic heads having similar core widths unless a large number of magnetic heads are manufactured. As a result, inventory of the manufactured magnetic heads continues to increase, which increases manufacturing costs as the multi-disc magnetic storage device.

BRIEF SUMMARY OF THE INVENTION

Embodiments of the present invention help provide a head stack assembly and a manufacturing method thereof, in which manufacturing costs as a multi-disc magnetic device are reduced by increasing the yield and reducing inventory of magnetic heads which can be assembled to the head stack assembly. According to the embodiment of FIG. 2, a head stack assembly and a manufacturing method thereof includes plural actuator arms A1 to A4 to which magnetic heads H are assembled through suspensions S. Furthermore, the tolerance of the core width or the write element width of magnetic heads Hb1, Hb2 assembled to inside actuator arms A2, A3 in the plural actuator arms is set to be narrower than the tolerance of the core width or the write element width of magnetic heads Hs1, Hb2 assembled to the outside actuator arms A1, A4.

BRIEF DESCRIPTION OF THE DRAWINGS

FIG. 14 is a view for explaining a procedure calculating the temporary tolerance from the target tolerance according to embodiments of the invention.

DETAILED DESCRIPTION OF THE INVENTION

Figure 1:
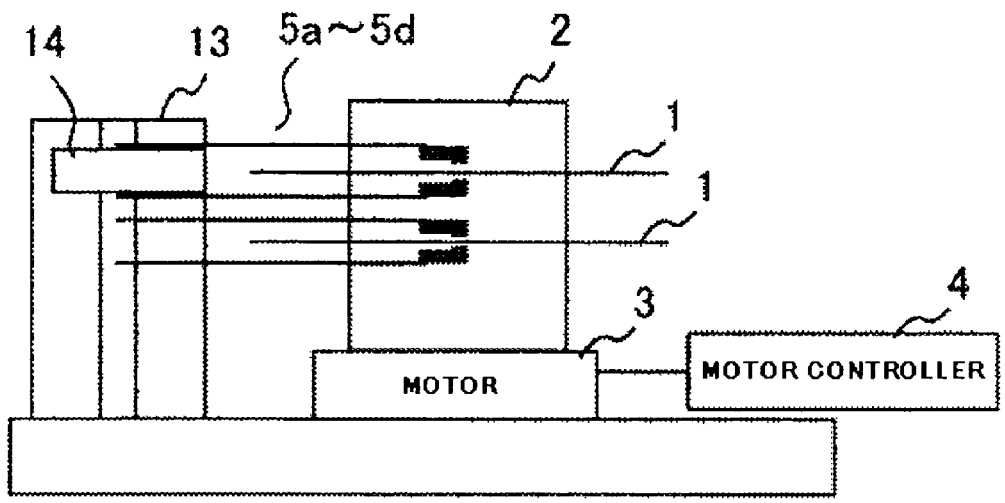
FIG. 1 is a view showing an outline configuration of a multi-disc magnetic storage device according to embodiments of the invention.

Embodiments of the invention relate to a multi-disc magnetic storage device, a head stack assembly assembled with respect to the multi-disc magnetic storage device and a manufacturing method thereof.

In order to solve the above problems, an object of embodiments of the invention is to provide a head stack assembly, a manufacturing method thereof and a multi-disc magnetic storage device which reduces manufacturing costs as the multi-disc magnetic storage device by increasing the yield and reducing inventory of magnetic heads which can be assembled to the head stack assembly.

In order to achieve the above object, embodiments of the invention include a head stack assembly having plural actuator arms to which magnetic heads are assembled through suspensions, which are characterized in that the tolerance of the core width or the write element width of magnetic heads assembled to inside actuator arms in the plural actuator arms is set to be narrower than the tolerance of the core width or the write element width of magnetic heads assembled to outside actuator arms.

Additionally, embodiments of the invention may be characterized in that the magnetic heads includes magnetic heads for the surface and magnetic heads for the back with respect to respective plural discs.

Additionally, embodiments of the invention include a multi-disc magnetic storage device which is characterized by including the head stack assembly.

Additionally, embodiments of the invention include a manufacturing method of a head stack assembly which is characterized by including a manufacturing step of sequentially manufacturing a group of magnetic heads, a measurement step of measuring the core width or the write element width of respective magnetic heads with respect to the group of magnetic heads sequentially manufactured in the manufacturing step, a classification step of classifying the group of magnetic heads into plural groups based on the core width or the write element width of respective magnetic heads measured in the measurement step and an assembling step of assembling magnetic heads of respective groups classified in the classification step to prescribed actuator arms in the head stack assembly.

Additionally, embodiments of the invention are characterized in that, in the classification step, the magnetic heads are at least classified into magnetic heads in which the tolerance of the core width or the write element width is narrow and magnetic heads in which the tolerance of the core width or the write element width is wide.

Additionally, embodiments of the invention relate to a manufacturing method of a head stack assembly which is characterized by including a manufacturing step of sequentially manufacturing a group of magnetic heads, a measurement step of measuring the core width or the write element width of respective magnetic heads with respect to the group of magnetic heads manufactured in the manufacturing step, a classification step of classifying the group of magnetic heads into at least magnetic heads having the core width or the write element width within the tolerance in which magnetic heads are assembled to inside actuator arms and magnetic heads having the core width or the write element width within the tolerance in which magnetic heads are assembled to outside actuator arms based on the core width or the write element width of respective magnetic heads measured in the measurement step, and an assembling step of assembling respective magnetic heads classified in the classification step to corresponding actuator arms.

Additionally, embodiments of the invention are characterized in that, in the classification step, the tolerance of the core width or the write element width of magnetic heads assembled to the inside actuator arms is narrower than the tolerance of the core width or the write element width of magnetic heads assembled to the outside actuator arms. Further, embodiments of the invention are characterized in that, in the assembling step, the tolerance of the core width or the write element width in which magnetic heads are assembled to the inside actuator arms is expanded only in the case that magnetic heads having the core width or the write element width within the tolerance in which magnetic heads are assembled to the inside actuator arms are insufficient in number or in the state close to the above. Further, embodiments of the invention are characterized in that the classification step includes an alignment process of aligning data of the core width or the write element width with respect to the group of magnetic heads measured in the measurement step, a data classification process of classifying data into plural types based on ranks of data aligned by the alignment process and a magnetic head classification process of classifying the group of magnetic heads into plural groups by a sorting apparatus based on results of data classified into plural types by the data classification process.

According to embodiments of the invention, it is possible to reduce manufacturing costs as a multi-disc magnetic storage device by increasing the yield and reducing inventory of magnetic heads which can be assembled to a head stack assembly.

A head stack assembly to be assembled to a multi-disc magnetic storage device (hereinafter, referred to as a simply a magnetic storage device) according to embodiments of the invention and a manufacturing method thereof will be explained with reference to the drawings.

First Embodiment

Figure 2:
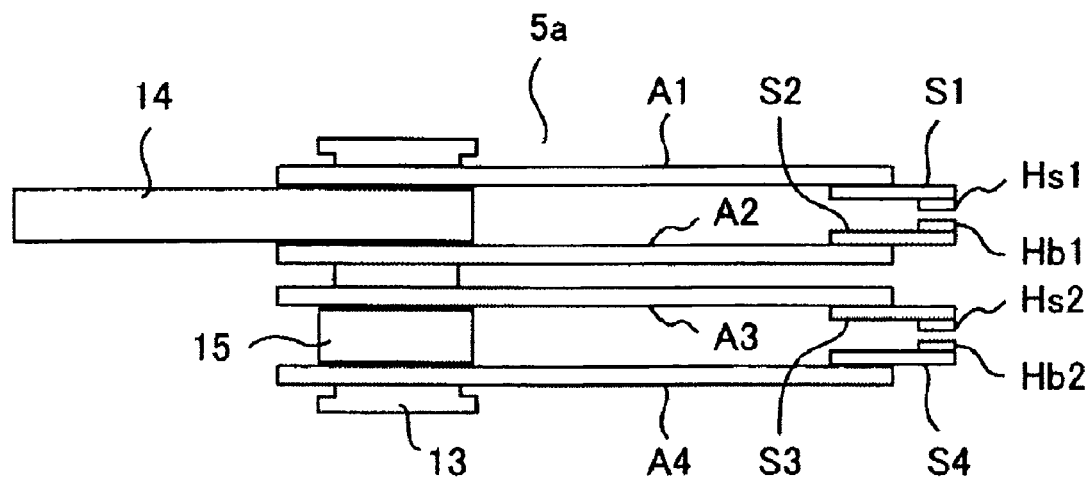
FIG. 2 is a view showing an outline configuration of a head stack assembly according to an embodiment of the invention.
Figure 15:
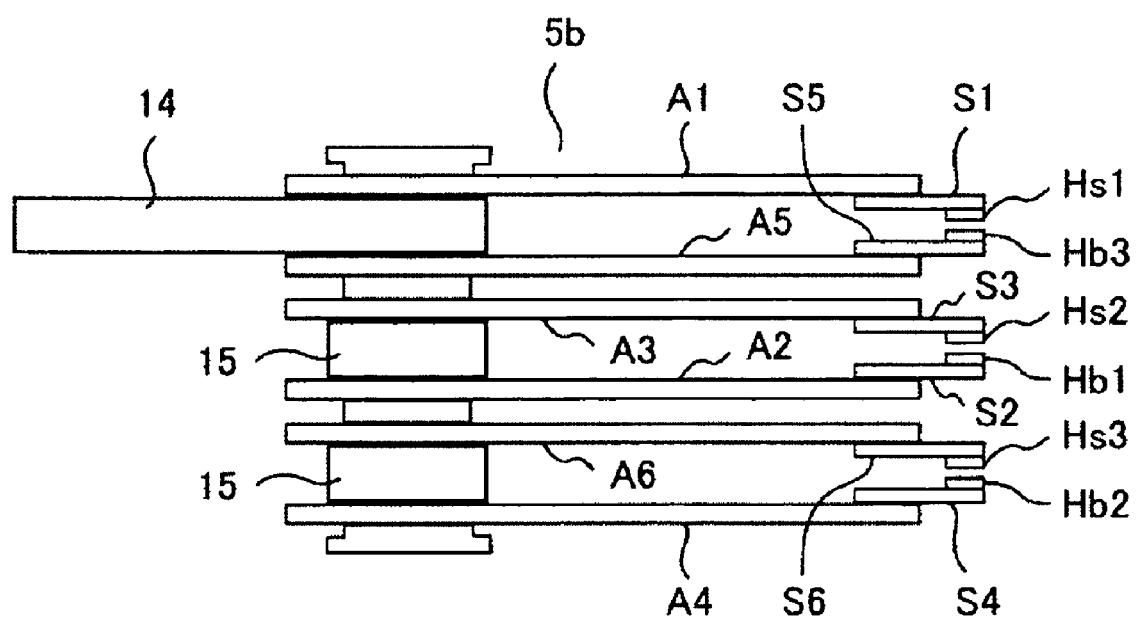
FIG. 15 is a view showing an outline configuration of a head stack assembly according to a fourth embodiment of the invention.

As shown in FIG. 1, a magnetic storage device is configured to perform recording/retrieving of information with respect to discs 1 which are plural storage media by plural magnetic heads. The multi-disc magnetic storage device includes a spindle 2 supporting plural pieces of magnetic discs 1 and rotated by a motor 3 controlled by a motor controller 4. The magnetic storage device is configured to have a head stack assemble (HSA) 5a, 5b, 5c or 5d to which four, six, eight or ten magnetic heads as shown in FIG. 2 or FIG. 15 according to the embodiments of invention, namely, two, three, four or five magnetic heads for the surface and two, three, four or five magnetic heads for the back are assembled with respect to two, three, four or five magnetic discs 1 respectively.

The head stack assembly (HSA) 5a includes a shaft 13, four actuator arms (hereinafter, referred to as simply arms) A1 to A4 which are integrally swing-driven by a voice coil motor (VCM) coil 14 about the shaft 13, respective suspensions S1 to S4 supported at tips of respective arms A1 to A4, respective sliders attached at tips of respective suspensions S1 to S4 and at which respective magnetic heads Hs1, Hb1, Hs2 and Hb2 are formed, a flexible printed circuit board (FPC) (not shown) having a control circuit performing recording/retrieving of information by respective magnetic heads Hs1, Hb1, Hs2 and Hb2 and controlling electric current to the VCM coil 14, and the like. Normally, head gimbal assemblies (HGA) in which respective sliders are connected to tips of respective suspensions S1 to S4 are attached to tips of respective arms A1 to A4.

Between arms, a spacer 15 and the VCM coil 14 which is integrally formed with the spacer are sandwiched. Note that the magnetic head Hs represents a head for the surface, and the magnetic head Hb represents a head for the back. The arms A2, A3 are inside arms to which the magnetic heads Hb1, Hs1 are attached which are references when a servo signal, namely, a magnetic positioning signal is written on the magnetic disc 1, and the arms A1, A4 shows outside arms with respect to the inside arms.

As described above, the magnetic storage device includes an HSA 5a to which plural magnetic heads Hs1, Hb1, Hs2 and Hb2 are assembled so as to correspond to plural discs (multi-disc) 1, and the HSA 5a has respective magnetic heads Hs1, Hs2 for the surface and magnetic heads Hb1, Hb2 for the back alternately. The magnetic heads Hs1, Hs2 for the surface and magnetic heads Hb1, Hb2 for the back are designed and manufactured so that an air bearing surface and the like is almost line-symmetrical with respect to the disc 1 for realizing highly accurate low flying. That is to say, the magnetic head for the surface and the magnetic head for the back including read elements and write elements in the magnetic heads are manufactured with microfabrication in accordance with different design drawings, therefore, it is difficult to manufacture the completed magnetic head for the surface and the magnetic head for the back so as to correspond to design values (target values), as well as they have different variations. Therefore, it is difficult to align magnetic heads for the surface and magnetic heads for the back having the core width (magnetic core width) of almost the same size, for example, at 5 nm pitch to be assembled to four arms A1 to A4 from a small number of completed magnetic heads for the surface and magnetic heads for the back, as a result, it is necessary to continue to manufacture magnetic heads for the surface and magnetic heads for the back until magnetic heads for the surface and magnetic heads for the back having the core width of almost the same size are aligned, consequently, a great deal of inventory of expensive magnetic heads for the surface and magnetic heads for the back continue to increase, lastly, a large number of increased expensive magnetic heads for the surface and magnetic heads for the back have to be disposed, which increases manufacturing costs as the magnetic storage device.

Accordingly, inventors have analyzed factors reducing the yield, that is to say, the good product rates of the magnetic storage devices from various viewpoints based on test data of many magnetic storage devices, aiming at improvement of the yield in the magnetic storage devices in order to reduce manufacturing costs of the magnetic storage devices. As a result, it has been found that, as one of factors reducing the yield of the magnetic storage devices, there is a phenomenon caused by combination of the core width (magnetic core width) of each magnetic head to be assembled to the HSA and an arm position at which the magnetic head is assembled. That is, as shown in FIG. 3 and FIG. 4, there is a correlation between the combination and the good product rates of the magnetic storage devices.

Figure 3:
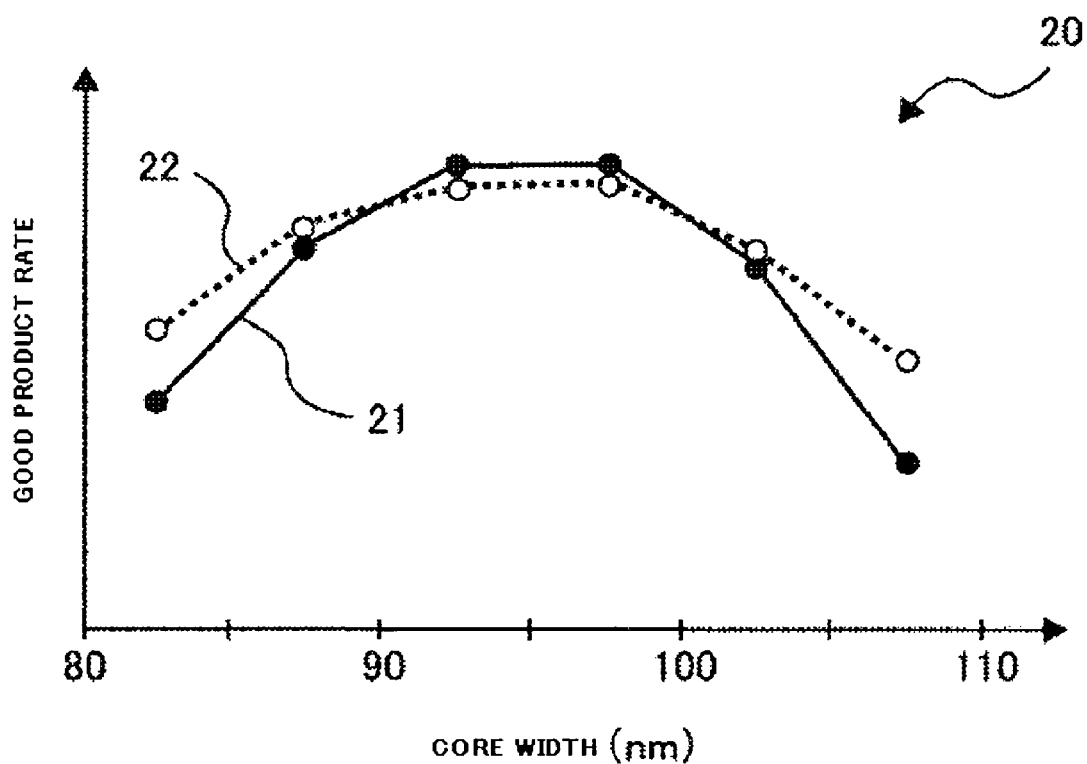
FIG. 3 is a graph showing correlation analysis results between combination of the core width of magnetic heads and arms to which the magnetic heads are assembled and the good product rate of the multi-disc magnetic storage device according to embodiments of the invention.
Figure 4:
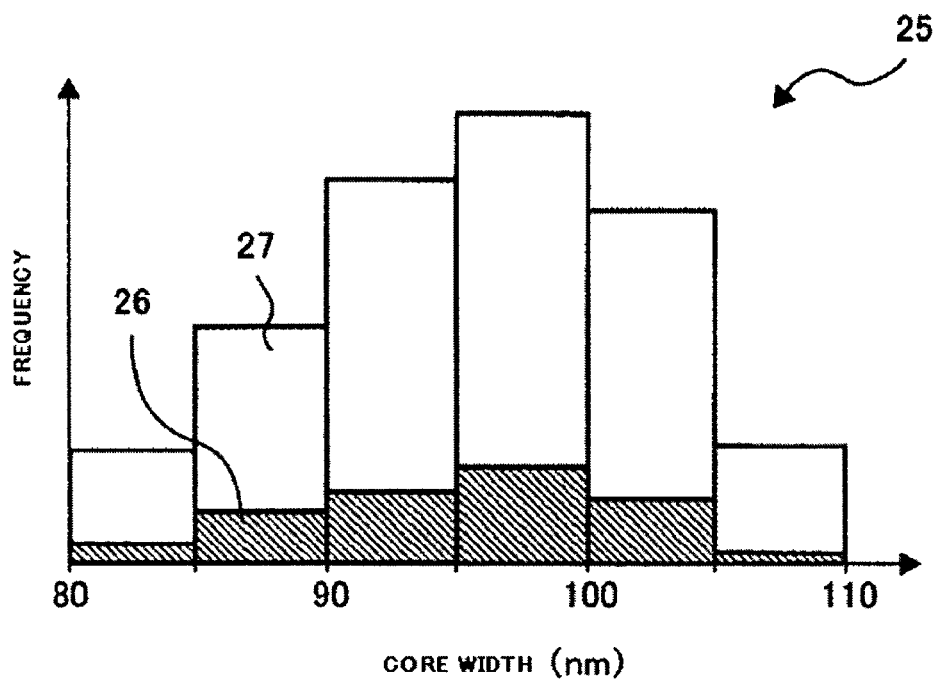
FIG. 4 is a view showing an embodiment of a histogram of core widths of many magnetic heads according to embodiments of the invention.

FIG. 3 is a graph indicating the result of the above analysis. A graph 20 represents results of comparing good product rates of the magnetic storage devices on which the head stack assembly 5a is mounted, to which four magnetic heads Hs1, Hb1, Hs2, Hb2, namely, two magnetic heads for the surface Hs1, Hs2 and two pieces of magnetic heads for the back Hb1, Hb are assembled with respect to two pieces of discs 1, with the results of the core width of the assembled magnetic heads, namely, the magnetic core width of the magnetic heads measured by an electric testing apparatus (tester) for the magnetic head. A solid sequential line graph 21 is obtained by calculating good product rates based on good/fail determination results as magnetic storage devices obtained when respective magnetic heads for the surface randomly selected from a group of many manufactured magnetic heads Hs for the surface in which the core width varies in a range of 80 to 100 nm are attached to the inside arm A3 of the HSA 5 in a large number of magnetic storage devices, dotting the calculated good product rates with respect to the core widths of respective magnetic heads for the surface selected randomly, and connecting the dots by the solid line. FIG. 4 represents frequency distribution of non-defectives and defectives as the magnetic storage devices obtained when the group of the magnetic heads for the surface Hs are attached to the arm A3 with respect to the core widths of the group of the many manufactured magnetic heads for the surface Hs used for calculating the dots of the solid sequential line graph 21 by a histogram. In the histogram 25, the core widths are sorted out at 5 nm pitch in the group of many manufactured magnetic heads for the surface Hs in which the core width varies in a range of 80 to 10 nm, and the frequency of the respective sorted classes is represented by the number of good magnetic storage devices, that is to say, non-defective magnetic storage devices and the number of defective magnetic storage devices, that is to say, failed magnetic storage devices when the group of sorted magnetic heads Hs for the surface is attached to the inside arm A3. Outline bars 27 represent the number of magnetic storage devices as non-defectives and bars 26 shown with slanting lines represent the number of magnetic storage devices as defectives. The positions of respective dots in the sequential line graph 21 shown in FIG. 3 are good product rates obtained by dividing the number of non-defective magnetic storage devices by the total number of the magnetic storage devices as detectives and non-defectives in respective classes in which the core width of the group of the many manufactured magnetic head for the surface Hs is sorted out at 5 nm pitch.

On the other hand, a dashed sequential line graph 22 is obtained, in the same manner as the analysis results of the solid sequential line graph 21, by calculating good product rates based on good/fail determination results as magnetic storage devices obtained when respective magnetic heads for the surface Hs randomly selected from the group of many manufactured magnetic heads for the surface in which the core width varies in a range of 80 to 110 nm are attached to the outside arm A1 of the HSA 5 in a large number of magnetic storage device, dotting the calculated good product rates with respect to the core widths of respective magnetic heads for the surface Hs selected randomly, and connecting the dots by the dashed line.

As described above, when comparing the solid sequential line graph 21 showing the good product rates of the magnetic storage devices in the case that the group of magnetic heads for the surface sorted out in respective classes is attached to the inside arm A3 with the dashed sequential line graph 22 showing the good product rates of the magnetic storage devices in the case that the group of magnetic heads for the surface sorted out in respective classes is attached to the outside arm A1, it has been found that the good product rates of the magnetic storage devices are high in both cases when the core width of the magnetic heads for the surface is between 90 nm and 100 nm, and the good product rates of the magnetic storage devices become lower when the core width is narrower or wider than the above range. However, when comparing the solid sequential line graph 21 with the dashed sequential line graph 22, it has been found that the good product rates of the magnetic storage devices are higher in the solid sequential line graph 21 than in the dashed sequential line graph 22 when the core width of the magnetic heads for the surface is between 90 nm to 100 nm, and good product rates of the solid sequential line graph 21 becomes lower than the dashed sequential line graph 22 when the core width is narrower or wider than the above range.

As the result that similar analysis was performed with respect to a group of many manufactured magnetic heads for the back Hb, the same results as the graph 20 shown in FIG. 3 can be obtained.

That is to say, as a result of the analysis, it has been found that there is a correlation between combination of the core width of each magnetic head to be assembled to the HSA 5 and the arm position (inside or outside) at which the magnetic head is assembled and the good product rate of the magnetic storage device. Also, it has been found that the size of the core width of the magnetic head affects the good/fail determination results as the magnetic storage device more sensitively in the case of the inside arms A2, A3 than in the case of the outside arms A1, A4 of HSA5. It is assumed that the reason is that the magnetic heads Hb1, Hs2 attached to the inside arms A2, A3 are references when a servo signal, namely, a magnetic positioning signal is written on the magnetic disc 1.

Figure 5:
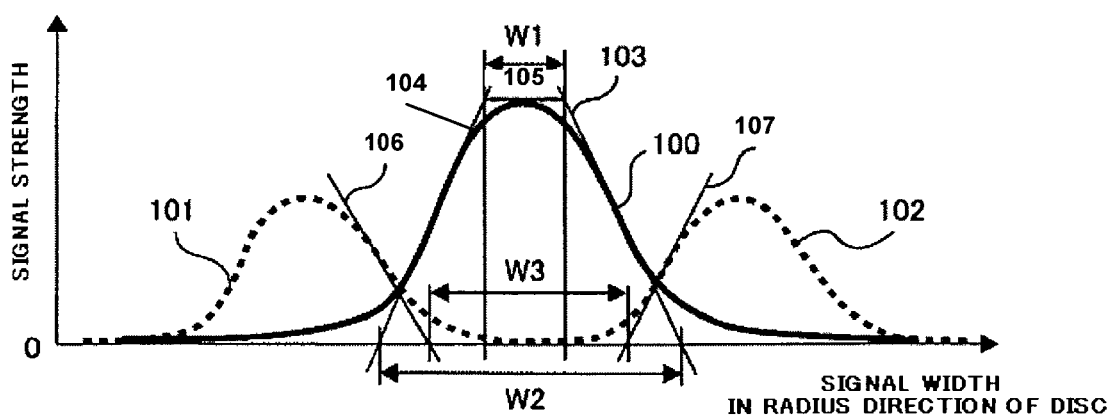
FIG. 5 is a view for explaining definition of core widths of magnetic heads according to embodiments of the invention.

Next, the definition of the magnetic core width of the magnetic head measured by the electric testing apparatus (tester) for the magnetic head will be explained with reference to FIG. 5. The magnetic core width of the magnetic head means the width of a signal recorded when a 1-bit magnetic signal is written on a disc by using a write element. FIG. 5 is a graph showing signal strength obtained by measuring signals recorded on the disc by the electric testing apparatus (tester) for the magnetic head. The horizontal axis represents the signal width in a radius direction of the disc and the vertical axis represents the signal strength. In the measurement of the core width, first, signals 101, 102 shown by dashed lines are written on tracks just adjacent to a signal whose core width is about to be measured on the disc by the electric testing apparatus (tester) for the magnetic head, next, a heavy-solid line signal 100 is written anew. The signal width at this time is the core width, actually, the newly written signal 100 is read by the electric testing apparatus (tester) for the magnetic head. Afterward, the core width which is the width of the read signal is measured. The above can be explained geometrically as follows. The width between intersections of tangents 103, 104 and 105 with respect to the newly written signal 100 is defined as W1, the width between intersections of the tangents 103, 104 and the x-axis is defined as W2, and the width between intersections of respective tangents 106, 107 of the signals 101, 102 of the adjacent tracks which have been previously written and the X-axis is defined as W3. At this time, the core width is a value as a quotient obtained by adding W2 and W3, then, the sum is divided by 2. The core width can be also defined as a quotient obtained by adding W1 and W2, then, the sum is divided by 2.

Since the magnetic core width of the magnetic head has extremely strong correlation with the geometric write element width, the write element width may be used as a substitute by visually measuring the write element width by a scanning electron microscope.

Next, an embodiment of the invention based on the above analysis results will be explained. That is, an embodiment of the invention is characterized in that, in a method of manufacturing the head stack assembly (HSA) 5a to be mounted on the magnetic storage device having two-pieces of discs 1 by assembling two magnetic heads for the surface Hs1, Hs2 and two magnetic heads for the back Hb1, Hb2 as shown in FIG. 1 and FIG. 2. In addition, a difference is made between the tolerance of the core width of the magnetic heads Hb1, Hs2 attached to the inside arms A2, A3 and the tolerance of the core width of the magnetic heads Hs1, Hb2 attached to the outside arms A1, A4. Specifically, as shown in the following Table 1, embodiments of the invention are characterized in that the tolerance of the core width (for example, 90 nm to 100 nm) of the magnetic head for the surface Hs2 attached to the inside arm A3 is prescribed to be narrower than the tolerance (for example, 80 nm to 110 nm) of the core width of the magnetic head for the surface Hs1 attached to the outside arm A1, and similarly, the tolerance of the core width (for example, 90 nm to 100 nm) of the magnetic head for the back Hb1 attached to the inside arm A2 is prescribed to be narrower than the tolerance (for example, 80 nm to 110 nm) of the core width of the magnetic head for the back Hb2 attached to the outside arm A4.

TABLE 1

| Head position | Tolerance of core width |
| --- | --- |
| outside (Hs1) | 80 nm to 110 nm |
| inside (Hb1) | 90 nm to 100 nm |
| inside (Hs2) | 90 nm to 100 nm |
| outside (Hb2) | 80 nm to 110 nm |

As described above, respective magnetic heads for the surface and magnetic heads for the back are sorted out into three groups which are a group in which the core widths are within the tolerance (for example, 90 nm to 100 nm) of the magnetic heads Hb1, Hs2 attached to the inside arms A2, A3, a group in which the core widths are within tolerance (for example, 80 nm to 110 nm) of the magnetic heads Hs1, Hb2 attached to the outside arms A1, A4 and a group in which the core widths are not within both tolerances, in the group of magnetic heads sequentially manufactured by microfabrication, thereby selecting the magnetic heads Hs1, Hb1, Hs2 and Hb2 to be assembled to four arms A1 to A4 immediately, as a result, it is possible to prevent generation of a great deal of inventory of the magnetic heads and to significantly reduce manufacturing costs of the magnetic storage device on which the head stack assembly 5 is mounted as well as it is possible to increase the good product rate of the magnetic storage device on which the head stack assembly is mounted as compared with a comparative example of manufacturing head stack assemblies in which the magnetic heads whose core width is within, for example, 80 nm to 110 nm are randomly assembled to the four arms A1 to A4.

As the tolerance of the core width of the magnetic heads, specific numeral values such as 80 nm, 90 nm, 100 nm and 110 nm are described. However, embodiments of the invention are not limited to the tolerance of the core width.

Also, embodiments of the invention are not limited to the HSA including the outside arms A1, A4 and the inside arms A2, A3 to which the respective four magnetic heads, specifically, two magnetic heads for the surface Hs1, Hs2 and two magnetic heads for the back Hb1, Hb2 are assembled. The same method can be applied to any HSA having outside arms and inside arms to which magnetic heads are assembled, regardless of the number of the magnetic heads.

Next, a first embodiment of a manufacturing method of the head stack assembly (HSA) according to embodiments of the invention will be explained. In this case, a HSA to which four magnetic heads, specifically, two magnetic heads for the surface Hs and two magnetic heads for the back Hb, are assembled. However, embodiments of the invention are not limited to the case of the HSA to which the four magnetic heads are assembled.

Figure 6:
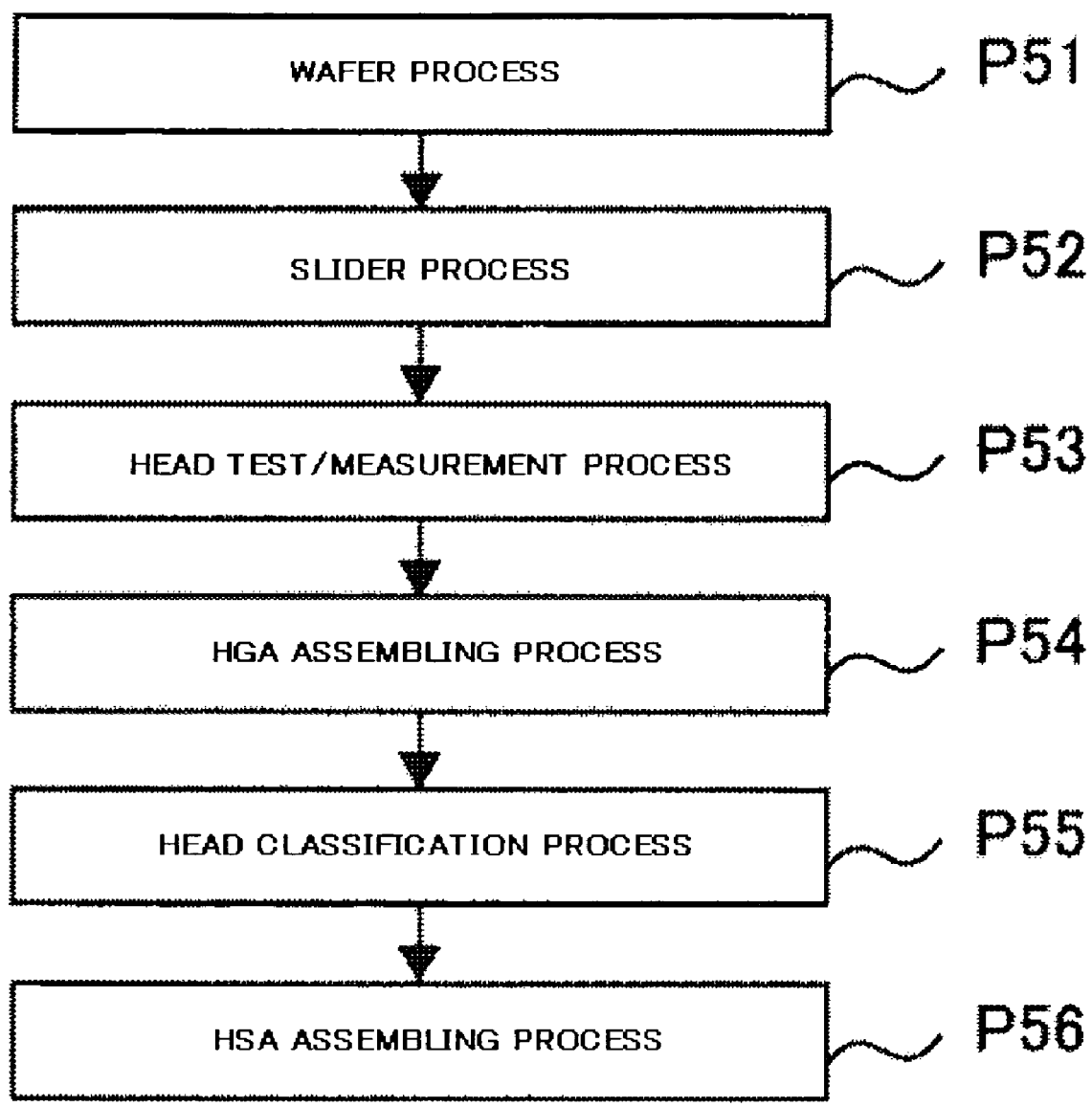
FIG. 6 is a view showing a manufacturing procedure from the magnetic head to the head stack assembly according to an embodiment of the invention.
Figure 7:
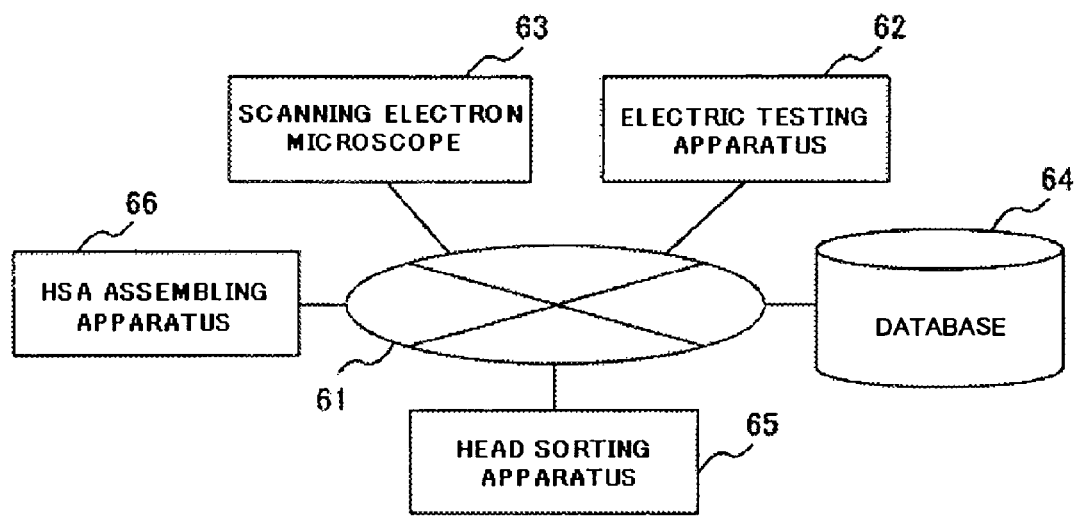
FIG. 7 is a view showing an outline configuration of hardware for manufacturing the head stack assembly according to an embodiment of the invention.

FIG. 6 is a view showing a first embodiment of a flowchart showing a manufacturing procedure from a manufacturing process of the magnetic heads Hs, Hb to an HSA assembling process according to embodiments of the invention. FIG. 7 is a block diagram showing a first embodiment of an outline configuration of hardware which executes a head test/measurement process to the HSA assembling process according to embodiments of the invention. An electric testing apparatus (tester) for the magnetic head 62 or a scanning electron microscope 63, a database 64, a head sorting apparatus 65 and an HSA assembling apparatus 66 are connected by, for example, a network 61.

The manufacturing process of the magnetic heads Hs, Hb includes a wafer process P51 and a slider process P52. For example, as described in Japanese Patent Publication No. 2002-331452, first, in the wafer process P51, resist coating, exposure, development, etching, deposition, polishing and the like are repeated to respective magnetic heads for the surface Hs and the magnetic heads for the back Hb, and a large number of three-dimensional structures of read elements (not shown) and write elements (not shown) for forming the magnetic head are arranged on a wafer (not shown) two-dimensionally. Next, in the slider process P52, sliders (not shown) in which the above magnetic heads including an air-bearing surface and the like are formed by cutting and polishing the wafer with respect to respective magnetic heads for the surface Hs and the magnetic heads for the back Hb. As explained above, the magnetic heads as the slider for being attached to (assembled) the head stack assembly 5 according to embodiments of the invention through the head gimbal assembly (HGA) are sequentially manufactured.

Next, in a head test/measurement process P53, the read element width and the write element width of the magnetic heads as sliders which are sequentially manufactured are measured with respect to respective magnetic heads for the surface Hs and magnetic heads for the back Hb using the electric testing apparatus (tester) for the magnetic head 62 or the scanning electron microscope 63 to be stored in the database 64 through the network 61. Here, the widths to be measured are the core width magnetically measured by the electric testing apparatus (tester) for the magnetic head 62 shown in FIG. 7 and the write element width visually observed by the scanning electron microscope 63. Particularly, the measurement of the size called as the magnetic core width of the magnetic head measured as shown in FIG. 5 by the electric testing apparatus (tester) 62 is important in embodiments of the invention. That is, it is not an exaggeration to say that the core width of the magnetic head determines the storage capacity of the magnetic storage device. Since the correlation between the magnetic core width and the write element width is extremely high, the write element width visually observed by the scanning electron microscope 63 can be measured and used as a substitute. Next, in a head gimbal assembly (HGA) assembling process P54, with respect to magnetic heads for the surface Hs and the magnetic heads for the back Hb, respective magnetic heads sequentially manufactured as respective sliders are connected to respective suspensions prepared separately to assemble the HGA. Next, in a head classification process P55, with respect to respective magnetic heads for the surface Hs and magnetic heads for the back Hb, data of core widths of respective magnetic heads stored in the database 64 is searched using serial numbers of respective magnetic heads of respective HGAs sequentially manufactured as keys in a head sorting apparatus 65, classifying the core widths of respective magnetic heads of the respective HGAs sequentially manufactured into tolerances (90 nm to 100 nm, 80 nm to 110 nm) in accordance with arm positions (inside, outside) at which respective magnetic heads are attached and a range not within the tolerances as shown in Table 1, storing the HGAs to which magnetic heads within the tolerance (90 nm to 100 nm) sequentially classified are connected in an unload tray 72 shown in FIG. 8 as the HGAs for inside arms, storing the HGAs to which magnetic heads within the tolerance (80 nm to 110 nm) sequentially classified are connected in an unload tray 73 shown in FIG. 8 as the HGAs for outside arms, then, storing the HGAs to which magnetic heads which are out of the tolerance sequentially classified are connected in an unload tray 74 as waste.

As a method of classification, it is possible to classify the magnetic heads in the tolerance can be classified into a group (90 nm to 100 nm) and a groups (80 nm to 90 nm, 100 nm to 110 nm).

Lastly, in a head stack assembly (HSA) assembling process P56, with respect to respective magnetic heads for the surface Hs and magnetic heads for the back Hb, HGAs stored in the unload tray 72 are assembled to the inside arms A3, A2 and HGAs stored in the unload tray 73 are assembled to the outside arms A1, A3 using the HSA assembling apparatus 66 to thereby complete the head stack assembly (HSA) 5, and the magnetic storage device having the completed head stack assembly (HSA) 5 can be manufactured with high good product rates, that is to say, the yield.

Figure 8:
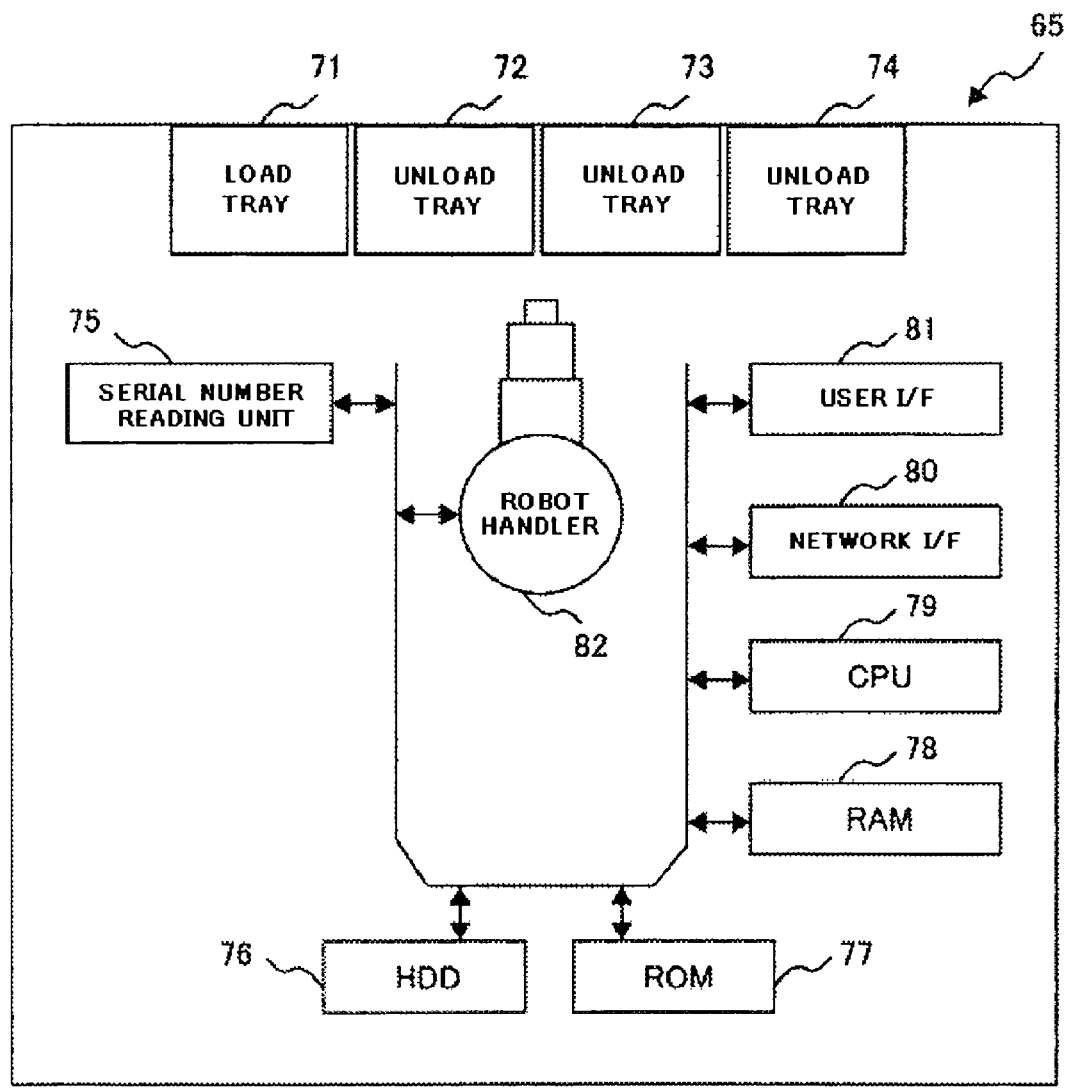
FIG. 8 is a view showing an embodiment of a head sorting apparatus according to embodiments of the invention.

Next, a specific embodiment of the head sorting apparatus 65 will be explained with reference to FIG. 8. With respect to respective magnetic heads for the surface Hs and magnetic heads for the back Hb, there is a load tray 71 in which plural magnetic heads before classification or the HGAs having plural magnetic heads are set and unload trays 72, 73 and 74 from which plural magnetic heads after classification or the HGAs having plural magnetic heads are taken out, and a robot handler 82 moving respective magnetic heads or the HGA having respective magnetic heads, a serial number reading unit 75 for reading serial numbers of magnetic heads, a magnetic storage device 76, a read only memory (ROM) 77, a random access memory (RAM) 78, a central processing unit (CPU) 79, a network interface 80, and a user interface 81 are connected respectively by a bus, which transmits and receives data mutually and executes various processing. The network interface 80 is connected to the network 61, which is capable of searching data of core widths of magnetic heads stored in the database 64 using serial numbers of magnetic heads as keys. For example, each magnetic head set in the tray 71 develops a program stored in the magnetic storage device 76 in the RAM 78 temporarily and the CPU 79 handles the robot handler 82. The robot handler 82 moves the handled magnetic heads to a position of the serial number reading unit 75 and reads the serial number of magnetic head. The read serial number is temporarily stored in the RAM 78, and transmitted to the database 64 through the network interface 80 and the network 61 by instruction of the CPU 79 to search data of core width of the serial number from the database 64. The searched data of core width is temporarily stored in the RAM 78 from the database 64 through the network 61 and the network interface 80. The CPU 79 performs classification into the tolerances (90 nm to 100 nm, 80 nm to 110 nm) in accordance with arm positions (inside, outside) at which respective magnetic heads are attached and the group out of the tolerance based on the data values of core widths stored in the RAM 78 as shown in Table 1, instructing the unload trays 72, 73 and 74 to which the respective sorted magnetic heads or the HGAs having respective magnetic heads are moved and stored with respect to the robot hander 82, then, unloading the magnetic heads.

Figure 9:
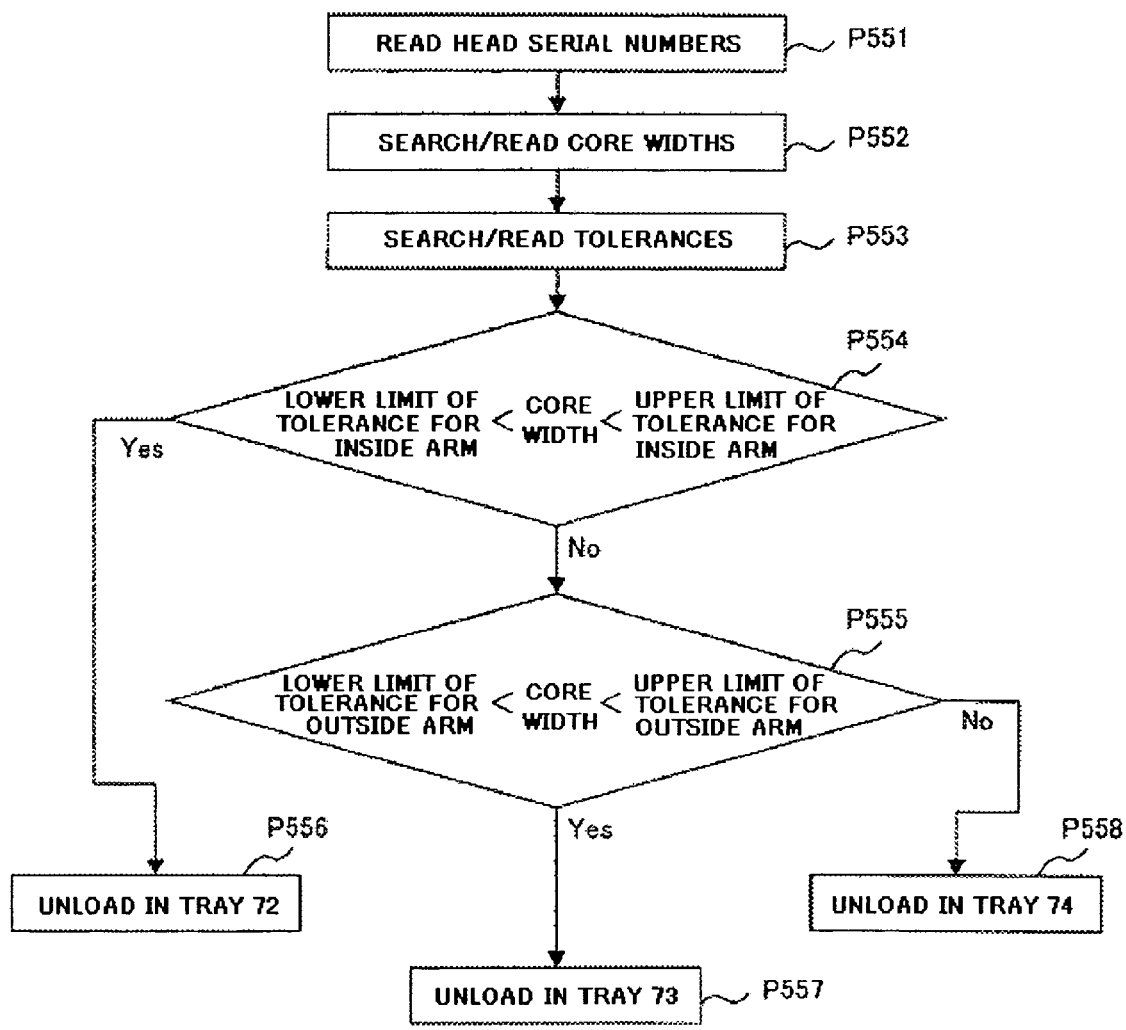
FIG. 9 is a specific processing procedure of a magnetic head classification procedure according to embodiments of the invention.

Next, a specific processing procedure processed in the head classification process P55 by a head sorting apparatus 65 with respect to respective magnetic heads for the surface Hs and magnetic heads for the back Hb which are sequentially manufactured will be explained with reference to FIG. 9. The serial number reading unit 75 reads serial numbers of magnetic heads which are sequentially manufactured (P551), after that, searches data of core widths with respect to the serial numbers of the magnetic heads which have been sequentially read from the database 64 and reads the data (P552), then, searches the tolerances prescribed in Table 1 from the magnetic storage device 76 and reads the range (P553). Next, in processing P554 and processing P555, conditional branch is performed with respect to respective magnetic heads for the surface Hs and magnetic heads for the back Hb based on the tolerances prescribed in Table 1 and data of core widths which are sequentially read. The processing P544 is the conditional branch of whether magnetic heads can be assembled to the inside arm A3 or A2 of the head stack assembly and the processing P555 is the conditional branch of whether magnetic heads can be assembled to the outside arm A1 or A4 of the head stack assembly. As a result, respective magnetic heads which have been sequentially manufactured are branched and stored in the tray 72 for magnetic heads assembled to the inside arms and in the tray 73 for magnetic heads assembled to the outside arms. In the tray 74, magnetic heads which are out of the tolerances prescribed in Table 1 are stored. In the case that magnetic heads which are out of the tolerances have been already screened in the head test/measurement process P53, there is no magnetic head to be unloaded in the tray 74. As a result of the processing, in the head stack assembly assembling process P56, magnetic heads put on the tray 72 are assembled to the inside arm A3 or A2 of the head stack assembly, and magnetic heads put on the tray 73 are assembled to the outside arm A1 or A4 of the head stack assembly with respect to respective magnetic heads for the surface Hs and magnetic heads for the back Hb.

Second Embodiment

Next, a second embodiment of a manufacturing method of the head stack assembly (HSA) according to embodiments of the invention will be explained in a case of the HSA to which four magnetic heads, namely, two magnetic heads for the surface Hs and two magnetic heads for the back Hb are assembled. However, embodiments of the invention are not limited to the case of the HSA to which four magnetic heads are assembled.

Figure 10:
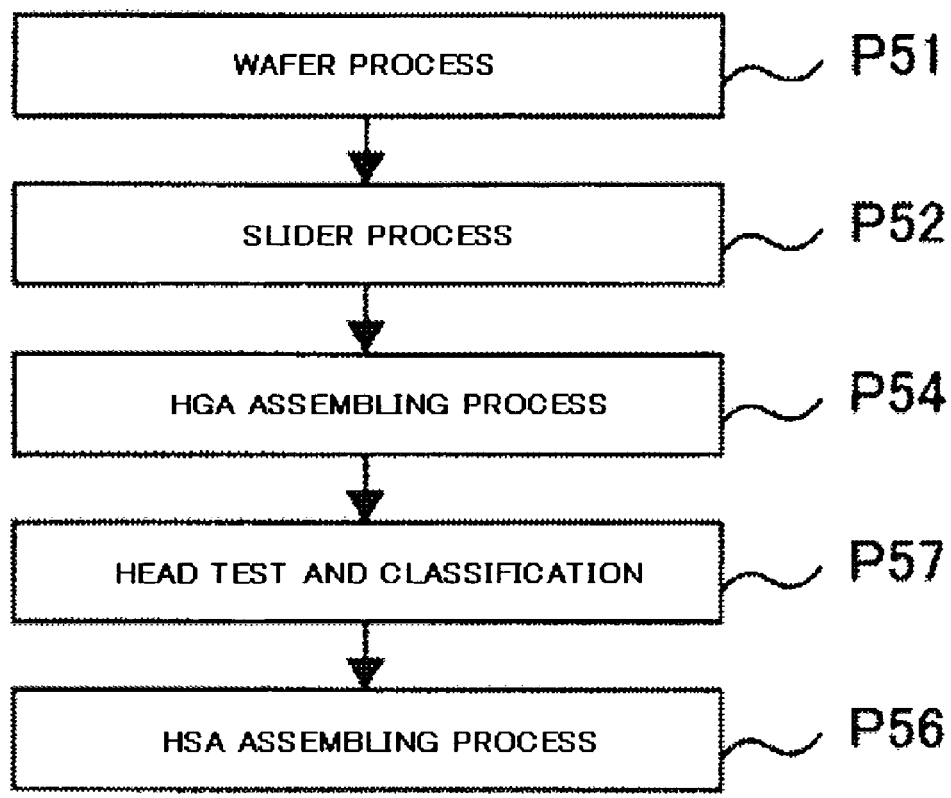
FIG. 10 is a view showing a manufacturing procedure from the magnetic head to the head stack assembly according to an embodiment of the invention.

FIG. 10 is a view showing a second embodiment of a flowchart showing a manufacturing procedure from manufacturing processes of magnetic heads Hs, Hb to a HSA assembling process according to embodiments of the invention. A point different from FIG. 6 is that a head test/classification process 57 is inserted instead of the head test/measurement process P53 and the head classification process P55. In the case of the manufacturing procedure, the core widths of magnetic heads used for manufacturing the head stack assembly are measured just before the head stack assembly assembling process P56.

Figure 11:
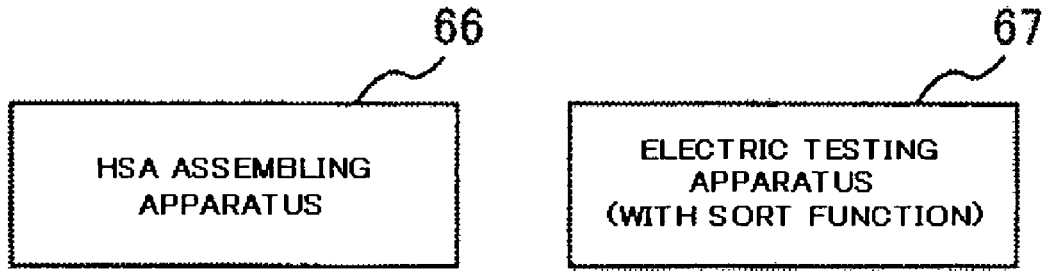
FIG. 11 is a view showing an outline configuration of hardware for manufacturing the head stack assembly according to an embodiment of the invention.

FIG. 11 is a block diagram showing a second embodiment of an outline configuration of hardware executing from the head test/measurement process to the HSA assembling process according to embodiments of the invention. It is necessary that only an electric testing apparatus with a sorting function 67 which executes the head test and classification process P57 and the head stack assembly (HSA) assembling apparatus 66 exist but it is not necessary that the network 61 and the database 64 do not exist.

Figure 12:
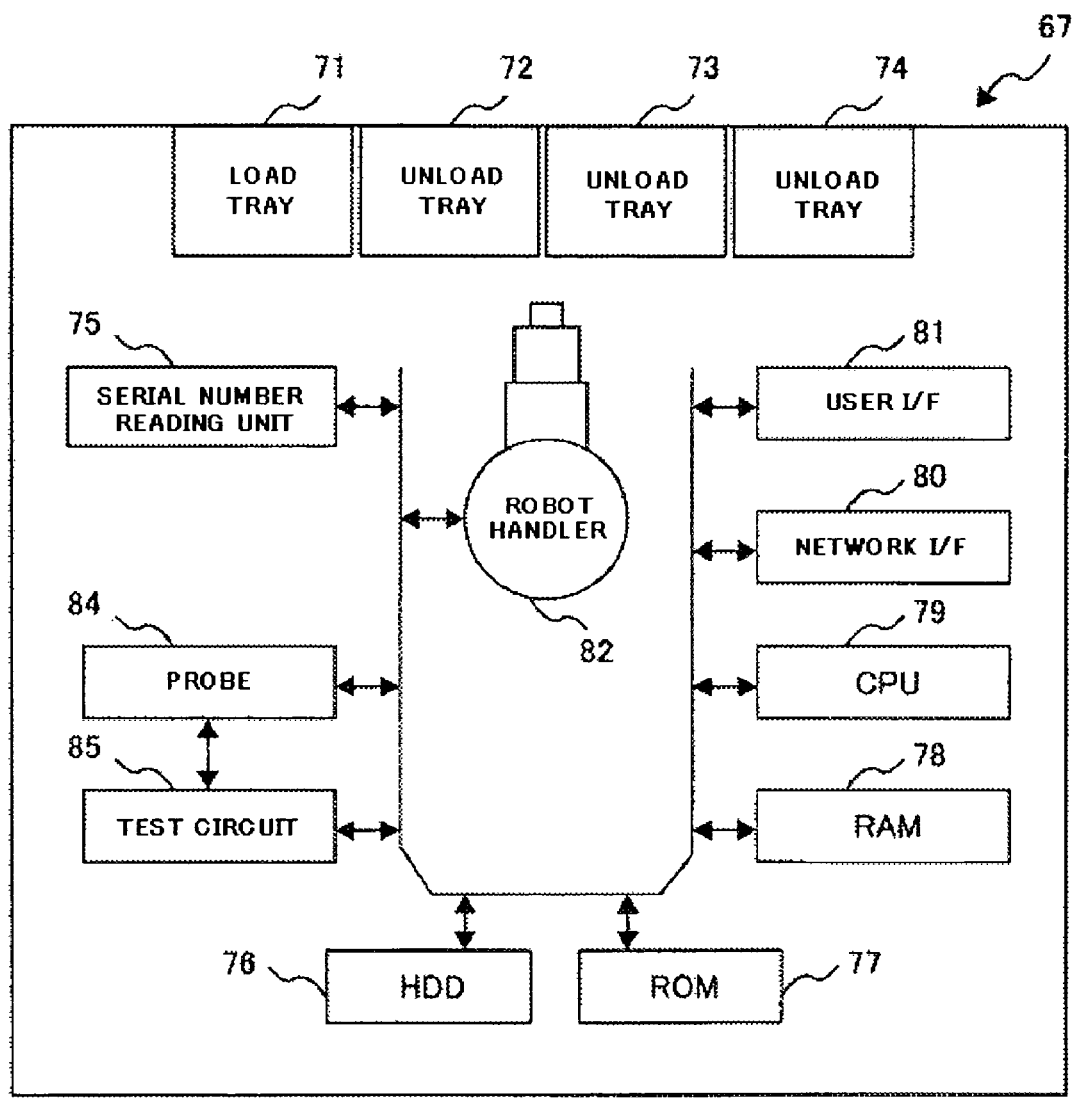
FIG. 12 is a view showing an embodiment of an electric testing apparatus with a sorting function according to embodiments of the invention.

FIG. 12 is a view showing an embodiment of the electric testing apparatus with the sorting function 67. Though the electric testing apparatus with the sorting function 67 has basically the same configuration as the head sorting apparatus 65 shown in FIG. 8, a probe 84 and a test circuit 85 are further incorporated in the head sorting apparatus 65. The probe 84 is touched to an electrical terminal of the magnetic head and an electrical signal pattern generated in the testing circuit 85 is given to the magnetic head to be written in a disc, then, the written signal is read to measure the magnetic core width of the magnetic head as shown in FIG. 5. The magnetic core widths of respective magnetic heads set in the tray 71 are measured by the electric testing apparatus with the sorting function 67, and respective magnetic heads are unloaded in any of trays 72, 73 or 74 based on the relation between values of the core width and the tolerances in accordance with the arm position in the same manner as the first embodiment. As a result of the processing, in the head stack assembly assembling process 56, magnetic heads put on the tray 72 are assembled to the inside arm A3 or A2 of the head stack assembly and magnetic heads put on the tray 73 are assembled to the outside arm A1 or A4 of the head stack assembly.

Also in the second embodiment, the magnetic write element width which has a high correlation with respect to the magnetic core width can be used instead of the magnetic core width.

Third Embodiment

Next, a third embodiment of a manufacturing method of a head stack assembly (HSA) according to embodiments of the invention, in the case of the HSA to which four magnetic heads, namely, two magnetic heads for the surface Hs and two magnetic heads for the back Hb are assembled, will be explained. However, embodiments of the invention are not limited to the case of the HSA to which the four magnetic heads are assembled.

In the third embodiment, a point different from the first embodiment is shown by the following Table 2 which prescribes tolerances. In Table 1, the difference is made in the tolerances of the core width based on whether respective magnetic heads for the surface Hs and magnetic heads for the back Hb are attached to the inside arms A2, A3 or outside arms A1, A4. However, when the difference is made in the tolerances of the core width in this manner, it is necessary that magnetic heads which are sequentially manufactured are strictly classified by the tolerances of the core width as shown in FIG. 9. However, when the magnetic heads are strictly classified by the tolerances of the core width, it is difficult to make use of all manufactured magnetic heads efficiently, and excess magnetic heads as scrap or inventory are generated, which causes losses from the viewpoint of costs. Accordingly, in Table 2, the tolerance of the core width is the same (80 nm to 110 nm) in the positions of all arms A1 to A4 to which magnetic heads are assembled. Alternatively, a target tolerance (90 nm to 100 nm) of the core width which prescribes the core width to be narrower than the tolerance (80 nm to 110 nm) of the core width is provided for magnetic heads to be assembled to the inside arms A2, A3. In the prescription, when magnetic heads which are sequentially manufactured have core widths within the tolerance (80 nm to 110 nm), any of magnetic heads can be assembled to the outside arms A1, A4, on the other hand, magnetic heads having core widths within the target tolerance (90 nm to 100 nm) are assembled to the inside arms A2, A3 as far as possible, and only in the case that magnetic heads having core widths within the target tolerance (90 nm to 100 nm) are insufficient in number or in the state close to the above, magnetic heads having core widths which are out of the target tolerance within the tolerance are assembled though the good product rate as the magnetic storage device reduces in some degree.

TABLE 2

| Head position | Tolerance of core width | Target tolerance of core width |
|---|---|---|
| Outside (Hs1) | 80 nm to 110 nm | — |
| Inside (Hb1) | | 90 nm to 100 nm |
| Inside (Hs2) | | 90 nm to 100 nm |
| Outside (Hb2) | 80 nm to 110 nm | — |

A basic manufacturing procedure of the HSA in the third embodiment is the same as the first embodiment shown in FIG. 6 except the head classification process P55, and a hardware configuration is the same as the first embodiment shown in FIG. 7.

Figure 13:
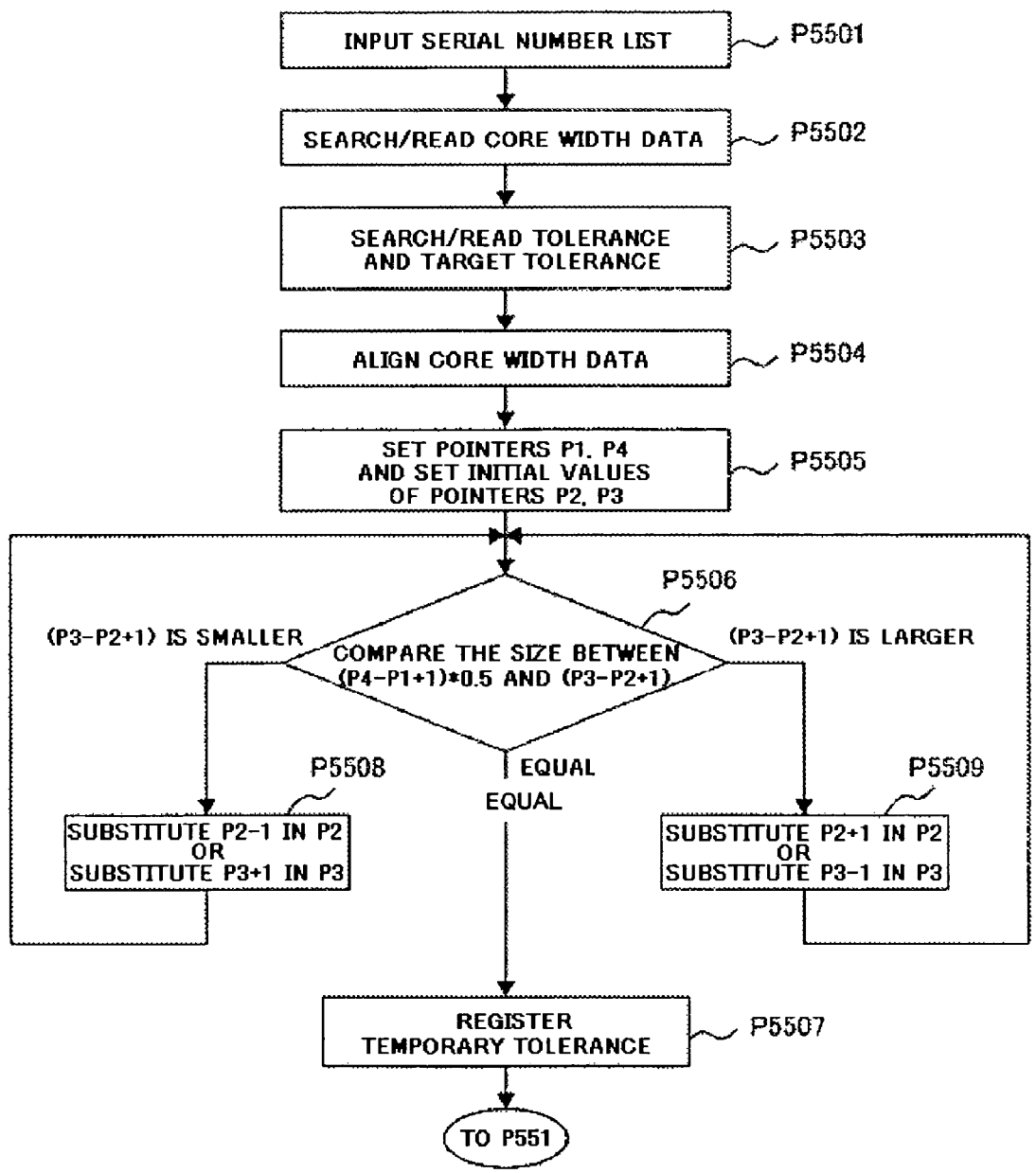
FIG. 13 is a view showing a method of prescribing a temporary tolerance from a target tolerance as preprocessing of a head classification procedure according to a third embodiment of the invention.

FIG. 13 is a view showing a third embodiment of the head classification process P55. The process shown here is pre-processing of FIG. 9 executed in the head sorting apparatus 65. First, in the network I/F 80, a serial number list input processing P5501 in which a serial number list of plural magnetic heads manufactured in a fixed period of time such as certain one day is inputted from a magnetic head manufacturing control system (not shown) is performed. Next, in the CPU 79 and the like, in a core width search/read process P5502, data of core widths with respect to the inputted serial numbers of plural magnetic heads is searched from the database 64 to be read in the RAM 78. Next, in the CPU 79 and the like, in a search/read process of tolerance and target tolerance P5503, the tolerance and target tolerance prescribed in the above Table 2 are searched from the magnetic storage device 76 to be read in the RAM 78. Next, in the CPU 79 and the like, in an alignment process of core width data P5504, data of serial numbers and core widths of magnetic heads are sorted in ascending order according to the size of values of core widths. In a process P5505 of setting pointers P1, P4 of the tolerance and setting initial values of pointers P2, P3 of the target tolerance, the CPU 79 and the like put pointers in the list of data of aligned serial numbers and core widths. Next, the CPU 79 and the like compare the number of magnetic heads within the tolerance which can be calculated from P4 and P1 with the number of magnetic heads within the target tolerance calculated from P2 and P3. In the third embodiment, the target tolerance of the core width is not provided with respect to the outside arms A1, A4 to which respective magnetic heads for the surface and magnetic heads for the back are attached, and the target tolerance of the core width is provided with respect to the inside arms A3, A2, therefore, when the half of the number of magnetic heads within the tolerance just corresponds to the number of magnetic heads within the target tolerance, scrap or inventory does not increase. Therefore, half of the number of magnetic heads within the tolerance is compared with the number of magnetic heads within the target tolerance (P5506). Next, the rank indicated by the pointer P2 or P3 is shifted by one (P5508, P5509) based on the comparison result. If the half of the number of magnetic heads within the tolerance is equal to the number of magnetic heads within the target tolerance, core width values of the ranks indicated by the pointers P2, P3 as the target tolerance are registered as a temporary tolerance with respect to inside arms A3 or A2 instead of the original tolerance (P5507). Next, the process proceeds to the process P551 of FIG. 9, and magnetic heads are classified.

FIG. 14 is a chart for explaining movement of pointers of FIG. 13. In the embodiment, a case in which fifty thousand serial numbers are inputted in the serial number list input processing P5501 as a group of magnetic heads for the surface Hs manufactured by manufacturing processes P51, P52 is shown. In the embodiment, the magnetic head the core width of which is minimum has a serial number AA1118715 and 83.53 nm in the core width, and the magnetic head the core width of which is maximum has a serial number AA1116901 and 119.2 nm in the core width. In the chart, core width values are aligned in ascending order. The left column represents order (ranking) of fifty thousand, the central column represents serial numbers and the right column represents core width values. Concerning the tolerance and the target tolerance, the lower limit of the tolerance is 80 nm, the upper limit of the tolerance is 110 nm, the lower limit of the target tolerance is 90 nm, and the upper limit of the target tolerance is 100 nm as shown in Table 2. First, the pointer P1 indicates the rank of the magnetic head having the minimum size in the tolerance. That is, the pointer P1 indicates the rank 1 in the embodiment. The pointer P2 indicates the magnetic head having the minimum core width in the target tolerance as an initial value. That is, the pointer P2 indicates the rank 12011 in the embodiment. The pointer P3 indicates the magnetic head having the maximum core width in the target tolerance as an initial value. That is, the pointer P3 indicates the rank 37001 in the embodiment. The pointer P4 indicates the magnetic head having the maximum core width in the tolerance. That is, the pointer P4 indicates the rank 50000 in the embodiment. The pointer P1 and the pointer P4 are fixed after that. On the other hand, the pointer P2 and the pointer P3 vary by one rank based on the conditional branch P5506, the process P5508 and the process P5509 shown in FIG. 13. For example, (P4−P1+1)*0.5 will be 25000 through (50000−1+1)*0.5 at first. On the other hand, (P3−P2+1) will be 24991 through (37001−12011+1) at first. In the conditional branch P5506, it is determined that (P3−P2+1) is smaller, and the process proceeds to the process P5508. In the process P5508, either of the process of subtracting 1 from P2 or the process of adding 1 to P3 is performed. The determination is performed by selecting the core width close to the target tolerance as a reference based on the comparison between the core width of the magnetic head indicated by (P2−1) and the core width of the magnetic head indicated by (P3+1). In the embodiment, the core width of the magnetic head indicated by (P2−1) is 89.97 nm, which is deviated by 0.03 nm from the target tolerance, and the core width of the magnetic head indicated by (P3+1) is 100.05 nm, which is deviated by 0.05 nm from the target tolerance. Accordingly, P2−1 is substituted in P2. That is, the position of the pointer P2 is shifted by one. At this time, nothing is performed to P3. According to the flowchart shown in FIG. 13, (P4−P1+1)*0.5 is 25000, therefore, calculation is repeated until (P3−P2+1) becomes 25000. As a result, P2 moves to the rank 12008, and P3 moves to the rank 37007. Next, in the process P5507 shown in FIG. 13, the range from 89.73 nm indicated by P2 to 100.27 nm indicated by P3 is prescribed as the temporary tolerance of the core width of magnetic heads attached to the inside arm A3, and processing after the process P551 is continued, in which magnetic heads are classified according to arm positions at which magnet heads for the surface Hs are attached to be stored in the unload trays 72, 73.

The same processing is performed also with respect to the group of magnetic heads for the back Hb manufactured by the manufacturing processes P51, P52, and the temporary tolerance of the core width to be attached to the inside arm A2 is prescribed, then, the magnetic heads are classified according to arm positions at which magnetic heads for the back Hb are attached to be stored in the unload trays 72, 73.

The magnetic heads or the HGAs including the magnetic heads classified and stored in the unload trays 72, 73 by the above method are set in the head stack assembly assembling apparatus 66, in which the HSA is assembled.

As explained above, according to the third embodiment, when magnetic heads which are sequentially manufactured have core widths within the tolerance (80 nm to 110 nm), any of magnetic heads can be assembled to the outside arms A1, A4, on the other hand, magnetic heads having core widths within the target tolerance (90 nm to 100 nm) are assembled to the inside arms A2, A3 as far as possible, and only in the case that magnetic heads having core widths within the target tolerance (90 nm to 100 nm) are insufficient in number, magnetic heads having core widths which are out of the target tolerance (90 nm to 100 nm) within the tolerance (80 nm to 110 nm) are assembled, thereby utilizing the many manufactured magnetic heads efficiently as well as significantly reducing manufacturing costs as the magnetic storage device by reducing excessive magnetic heads as scrap or inventory.

Also in the third embodiment, the magnetic write element width which has a high correlation with respect to the magnetic core width can be used instead of the magnetic core width.

Fourth Embodiment

FIG. 15 is a view showing a fourth embodiment of an HSA to which three magnetic heads for the surface Hs and three magnetic heads for the back Hb, namely, the total six magnetic heads are assembled according to embodiments of the invention. Here, Table 3 shown as follows represents an embodiment in which the tolerance of the core width of magnetic heads Hs2, Hb1 attached to the inside arms A3, A2 is set to be narrow and the tolerance of the core width of magnetic heads Hs1, Hb2, Hb3 and Hs3 attached to the outside arms A1, A4, A5 and A6 is set to be wider. Table 4 shown as follows represents an embodiment in which the tolerance of the core width of magnetic heads Hs2, Hb1, and Hb3 attached to the inside arms A3, A2, A5 and A6 is set to be narrow and the tolerance of the core width of magnetic heads Hs1, Hb2 attached to the outside arms A1, A4 is set to be wider.

TABLE 3

| Head position | Tolerance of core width |
| --- | --- |
| Outside (Hs1) | 80 nm to 110 nm |
| Outside (Hb3) | 80 nm to 110 nm |
| Inside (Hs2) | 90 nm to 100 nm |
| Inside (Hb1) | 90 nm to 100 nm |
| Outside (Hs3) | 80 nm to 110 nm |
| Outside (Hb2) | 80 nm to 110 nm |

TABLE 4

| Head position | Tolerance of core width |
| --- | --- |
| Outside (Hs1) | 80 nm to 110 nm |
| Inside (Hb3) | 90 nm to 100 nm |
| Inside (Hs2) | 90 nm to 100 nm |
| Inside (Hb1) | 90 nm to 100 nm |

TABLE 4-continued

| Head position | Tolerance of core width |
| --- | --- |
| Inside (Hs3) | 90 nm to 100 nm |
| Outside (Hb2) | 80 nm to 110 nm |

Similarly, in an HSA 5c to which four magnetic heads for the surface Hs, four magnetic heads for the back Hb, namely, a total of eight magnetic heads are assembled, it can be considered that a case in which two arms are defined as inside arms and six arms at both sides of the inside arms are defined as outside arms, a case in which four arms are defined as inside arms and four arms at both sides of the inside arms are defined as outside arms, and a case in which six arms are defined as inside arms and two arms at both sides of the inside arms are defined as outside arms.

In an HSA 5d to which five magnetic heads for the surface, five magnetic heads for the back, namely, a total of ten magnetic heads are assembled, it can be considered that a case in which two arms are defined as inside arms and eight arms at both sides of the inside arms are defined as outside arms, a case in which four arms are defined as inside arms and six arms at both sides of the inside arms are defined as outside arms, a case in which six arms are defined as inside arms and four arms at both sides of the inside arms are defined as outside arms and a case in which eight arms are defined as inside arms and two arms at both sides of the inside arms are defined as outside arms.

In either case, when the number of inside arms to which magnetic heads having narrow tolerance in the core width are attached is decreased and the number of outside arms to which magnetic heads having wide tolerance in the core wide are attached is increased, it is possible to reduce inventory of magnetic heads which are sequentially manufactured as well as to reduce manufacturing costs though the good product rates. That is to say, the yield of the magnetic storage devices is reduced in some degree.

Fifth Embodiment

Next, results of performing reverse engineering with respect to the HSA manufactured by randomly assembling magnetic heads as a comparative example and the HSA manufactured based on embodiments of the invention will be explained. In this case, an embodiment of the HSA to which four magnetic heads are assembled is shown. However, embodiments of the invention are not limited to the HSA to which four magnetic heads are assembled, and the same pattern can be confirmed by using the HSA to which plural magnetic heads are assembled regardless of the number of magnetic heads.

Figure 16:
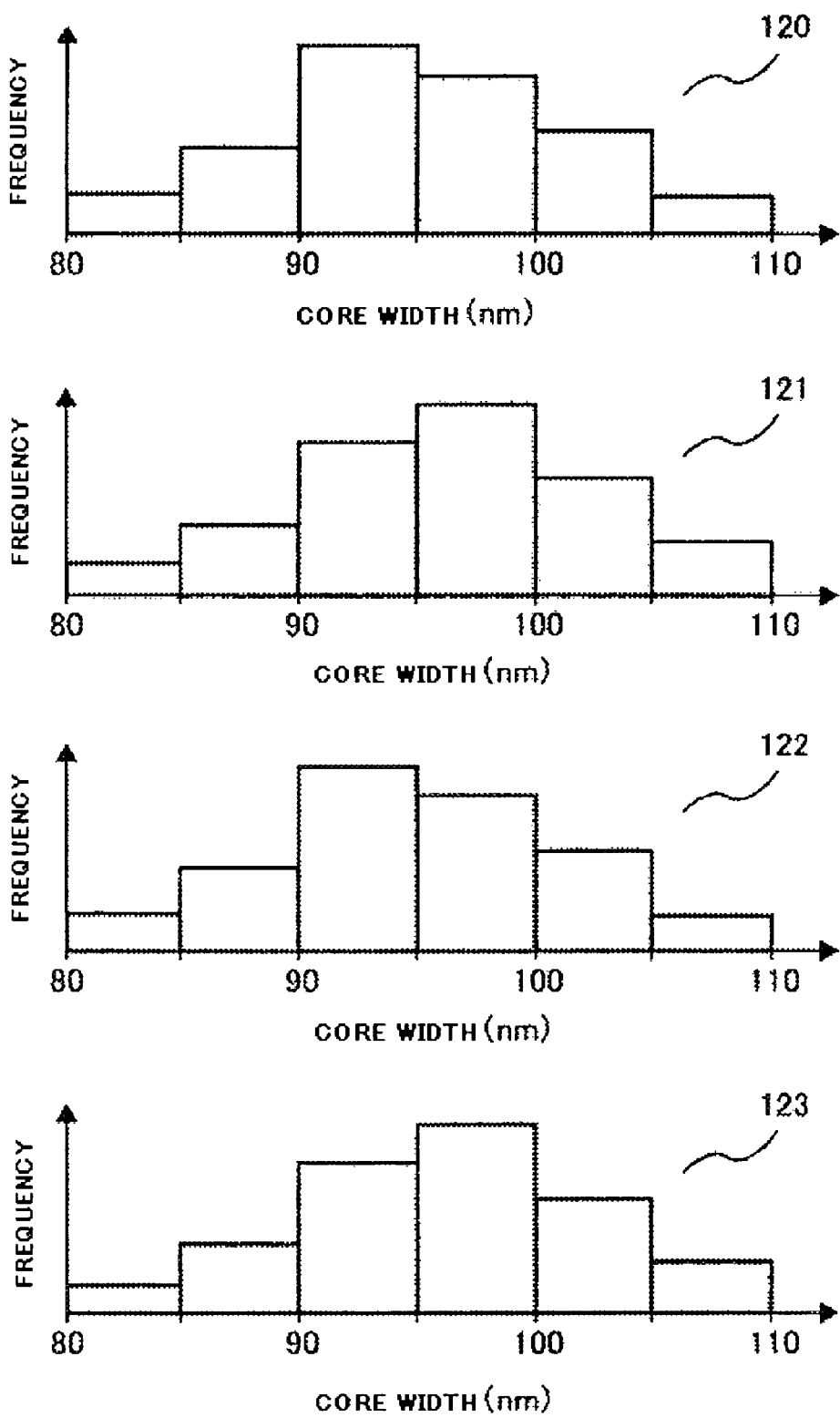
FIG. 16 is a view showing distributions of results in which core widths of magnetic heads are measured, which are attached to respective arms of many HSAs manufactured by randomly assembling magnetic heads as comparative examples.

FIG. 16 shows distributions of results obtained by measuring core widths of magnetic heads attached to respective arms of many HSAs manufactured by randomly assembling magnetic heads as comparative examples. A histogram 120 represents distribution of core widths of magnetic heads attached to the arm position A1, a histogram 121 represents distribution of core widths of magnetic heads attached to the arm position A2, a histogram 122 represents distribution of core widths of magnetic heads attached to the arm position A3, and a histogram 123 represents distribution of core widths of magnetic heads attached to the arm position A4. In a manufacturing method of comparative example, magnetic heads randomly selected from many magnetic heads for the surface are attached to the arm positions A1 and A3, and magnetic heads randomly selected from many magnetic heads for the back are attached to the arm positions A2 and A4, therefore, the histogram 120 and the histogram 122 have almost the same distribution. Also, the histogram 121 and the histogram 123 have almost the same distribution. Whether the distribution is the same or not can be found by calculating significance probability (p-value) by using test of statistical hypothesis such as t-test or F-test. For example, when the significance probability is smaller than 0.05 or 0.01, the distribution is not the same. On the other hand, when the significance probability is larger than 0.05 or 0.01, it is determined that the distribution is the same. In the manufacturing method of the comparative example, a value larger than 0.01 as significance probability (p-value) is calculated unless any problem happens.

Figure 17:
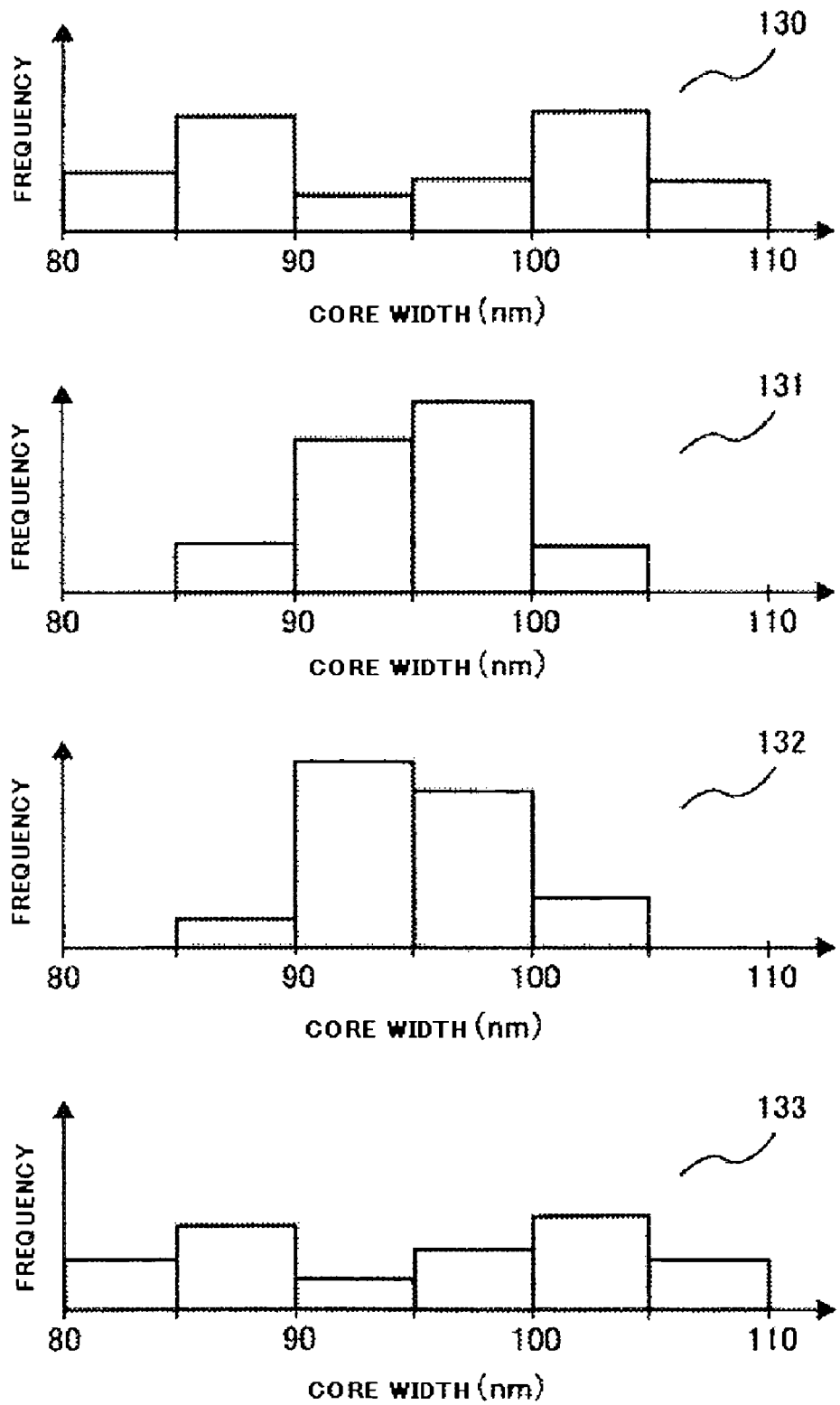
FIG. 17 is a view showing distributions of results in which core widths of magnetic heads are measured, which are attached to respective arms of many head stack assemblies manufactured based on embodiments of the invention.

FIG. 17 shows distributions of results obtained by measuring core widths of magnetic heads attached to respective arms of many head stack assemblies manufactured based on embodiments of the invention. A histogram 130 represents distribution of core widths of magnetic heads attached to the arm position A1, a histogram 131 represents distribution of core widths of magnetic heads attached to the arm position A2, a histogram 132 represents distribution of core widths of magnetic heads attached to the arm position A3 and a histogram 133 represents distribution of core widths of magnetic heads attached to the arm position A4. In the manufacturing method according to embodiments of the invention, different tolerances are set to the arm positions A1 and A3 though both are magnetic heads for the surface. Also, different tolerances are set to the arm positions A2 and A4 though both are magnetic heads for the back. Accordingly, the histogram 130 and the histogram 132 obviously have different distributions. Also, the histogram 131 and the histogram 133 have obviously different distributions. That is, when a significant probability (p-value) is calculated by using a test of statistical hypothesis such as a t-test or F-test, a value smaller than 0.01 is calculated.

What is claimed is:

1. A head stack assembly comprising:
    plural actuator arms to which magnetic heads are assembled through suspensions, wherein a tolerance of a core width or a write element width of magnetic heads to be assembled to inside actuator arms in the plural actuator arms, is narrower than a tolerance of the core width or the write element width of magnetic heads assembled to outside actuator arms.

2. The head stack assembly according to claim 1, wherein the magnetic heads include magnetic heads for a surface and magnetic heads for a back with respect to respective plural discs.

3. A multi-disc magnetic storage device, comprising:
    a plurality of magnetic storage disks; and
    plural actuator arms to which magnetic heads are assembled through suspensions, wherein a tolerance of a core width or a write element width of magnetic heads to be assembled to inside actuator arms in the plural actuator arms, is narrower than a tolerance of the core width or the write element width of magnetic heads assembled to outside actuator arms.

4. The multi-disc magnetic storage device of claim 3, wherein the magnetic heads include magnetic heads for a surface and magnetic heads for a back with respect to respective plural discs.

5. A manufacturing method of a head stack assembly, comprising:
    manufacturing a group of magnetic heads sequentially;
    measuring a core width or a write element width of respective magnetic heads with respect to the group of magnetic heads sequentially manufactured;
    classifying the group of magnetic heads into plural groups based on the core width or the write element width of respective measured heads; and
    assembling magnetic heads of respective classified groups, to prescribed actuator arms in the head stack assembly,
    wherein in the classifying, the tolerance of the core width or the write element width of the magnetic heads assembled to the inside actuator arms is narrower than the tolerance of the core width or the write element width of the magnetic heads assembled to the outside actuator arms.

6. The manufacturing method of the head stack assembly according to claim 5, wherein the classifying includes an alignment process of aligning data of the core width or the write element width with respect to the group of magnetic heads measured in the measurement step, a data classification process of classifying data into plural types based on ranks of data aligned by the alignment process, and a magnetic head classification process of classifying the group of magnetic heads into plural groups by a sorting apparatus based on results of data classified into plural types by the data classification process.

7. The manufacturing method of the head stack assembly according to claim 5, wherein in the classifying, the magnetic heads are at least classified into magnetic heads in which the tolerance of the core width or the write element width is narrow, and magnetic heads in which the tolerance of the core width of the write element width is wide.

8. The manufacturing method of the head stack assembly according to claim 5, wherein in the classifying, the plural groups to be classified are at least magnetic heads having the core width or the write element width within the tolerance in which the magnetic heads are assembled to inside actuator arms and magnetic heads having the core width or the write element width within the tolerance in which the magnetic heads are assembled to outside actuator arms.

9. The manufacturing method of the head stack assembly according to claim 5, wherein, in the assembling, the tolerance of the core width or the write element width in which magnetic heads are assembled to the inside actuator arms is expanded only in the case that magnetic heads having the core width or the write element width within the tolerance in which magnetic heads are assembled to the inside actuator arms are insufficient in number.

10. A manufacturing method of a head stack assembly, comprising:
    manufacturing a group of magnetic heads sequentially;
    measuring a core width or a write element width of respective magnetic heads with respect to the group of magnetic heads manufactured;
    classifying the group of magnetic heads into at least magnetic heads having the core width or the write element width within the tolerance in which magnetic heads are assembled to inside actuator arms, and magnetic heads having the core width or the write element width within the tolerance in which magnetic heads are assembled to outside actuator arms, based on the core width or the write element width of respective magnetic heads measured in the measurement step; and
    assembling respective magnetic heads classified in the classification step to corresponding actuator arms, wherein in the classifying, the tolerance of the core width or the write element width of the magnetic heads assembled to the inside actuator arms is narrower than the tolerance of the core width or the write element width of the magnetic heads assembled to the outside actuator arms.

11. The manufacturing method of the head stack assembly according to claim 10, wherein in the assembling, the tolerance of the core width or the write element width in which magnetic heads are assembled to the inside actuator arms is expanded only in the case that magnetic heads having the core width or the write element width within the tolerance in which magnetic heads are assembled to the inside actuator arms are insufficient in number.

12. The manufacturing method of the head stack assembly according to claim 10, wherein the classifying includes an alignment process of aligning data of the core width or the write element width with respect to the group of magnetic heads measured in the measurement step, a data classification process of classifying data into plural types based on ranks of data aligned by the alignment process, and a magnetic head classification process of classifying the group of magnetic heads into plural groups by a sorting apparatus based on results of data classified into plural types by the data classification process.

* * * * *